United States Patent [19]

Lu et al.

[11] Patent Number: 5,539,290
[45] Date of Patent: Jul. 23, 1996

[54] AUTOMATIC VENTING SYSTEM FOR A VEHICLE WITH OBSTRUCTION DETECTION UTILIZING DYNAMICALLY MODIFIED THRESHOLDS

[75] Inventors: Michael Y. Lu, Nashua, N.H.; Peter J. Pan, Tyngsboro; Cliff L. Chuang, Lowell, both of Mass.

[73] Assignee: Prospects Corporation, Tyngsboro, Mass.

[21] Appl. No.: 348,229

[22] Filed: Nov. 28, 1994

Related U.S. Application Data

[63] Continuation of Ser. No. 227,198, Apr. 13, 1994, Pat. No. 5,399,950, which is a continuation of Ser. No. 30,665, Mar. 12, 1993, abandoned.

[51] Int. Cl.$^6$ .............................. G05B 23/02; G05G 5/04
[52] U.S. Cl. .................. 318/565; 318/626; 318/434; 318/469; 388/823; 388/903; 388/909
[58] Field of Search .................................. 318/565, 566, 318/626, 264, 265, 266, 286, 430, 431, 434, 445, 446, 466, 467, 468, 469; 388/806, 815, 823, 833, 903, 909, 916

[56] References Cited

U.S. PATENT DOCUMENTS

| | | |
|---|---|---|
| 4,264,849 | 4/1981 | Fleischer et al. . |
| 4,278,922 | 7/1981 | Grebe . |
| 4,347,465 | 8/1982 | Goertler et al. . |
| 4,376,971 | 3/1983 | Landgraf et al. . |
| 4,471,274 | 9/1984 | Ross et al. .............................. 318/282 |
| 4,533,901 | 8/1985 | Lederle . |
| 4,544,865 | 10/1985 | Sharp ........................................ 318/53 |
| 4,546,845 | 10/1985 | Meyer et al. .......................... 180/286 |
| 4,553,656 | 11/1985 | Lense ................................... 192/142 R |
| 4,556,835 | 12/1985 | Vogel et al. ............................. 318/663 |
| 4,561,691 | 12/1985 | Kawai et al. . |
| 4,585,981 | 4/1986 | Zintler . |
| 4,641,067 | 2/1987 | Iizawa et al. . |
| 4,686,598 | 8/1987 | Klaus-Dieter Herr . |
| 4,710,685 | 12/1987 | Lehnhoff et al. . |
| 4,746,845 | 5/1988 | Mizuta et al. . |
| 4,749,924 | 7/1988 | Watanabe et al. . |
| 4,803,807 | 2/1989 | Stockermann et al. . |
| 4,808,894 | 2/1989 | Mizuta . |
| 4,852,469 | 8/1989 | Chuang . |
| 4,870,333 | 9/1989 | Itoh et al. . |
| 4,908,554 | 3/1990 | Chance . |
| 4,933,610 | 6/1990 | Memmola . |
| 4,952,855 | 8/1990 | Meins et al. ............................ 318/467 |
| 5,051,672 | 9/1991 | Yaguchi . |
| 5,054,686 | 10/1991 | Chuang . |
| 5,057,754 | 10/1991 | Bell . |
| 5,069,000 | 12/1991 | Zuckerman ................................. 49/28 |
| 5,334,876 | 8/1994 | Washeleski et al. .................. 307/10.1 |

FOREIGN PATENT DOCUMENTS

| | | |
|---|---|---|
| 3532078 | 4/1986 | Germany . |
| 2147432 | 5/1985 | United Kingdom . |
| 2198860 | 6/1988 | United Kingdom . |

*Primary Examiner*—Bentsu Ro
*Attorney, Agent, or Firm*—Fish & Richardson

[57] ABSTRACT

A motor control system for controlling operation of an electric motor associated with a motor-operated vent in a vehicle. The system monitors and stores data relating to the operating current and detects occurrences of abnormal loads applied to the vent by determining whether the monitored operating current exceeds one of several predetermined thresholds. The predetermined thresholds are dynamically modified in accordance with monitored condition variations of the operating current. The dynamically modified thresholds are initially based on either a value associated with the stall current of the vent motor or the start spike current of the vent motor. In addition, an embodiment is provided for monitoring and storing data relating to ripple current waves associated with the operating current, so that occurrences of abnormal loads may be detected by determining whether the frequency of the monitored ripple current waves is less than a predetermined value.

49 Claims, 11 Drawing Sheets

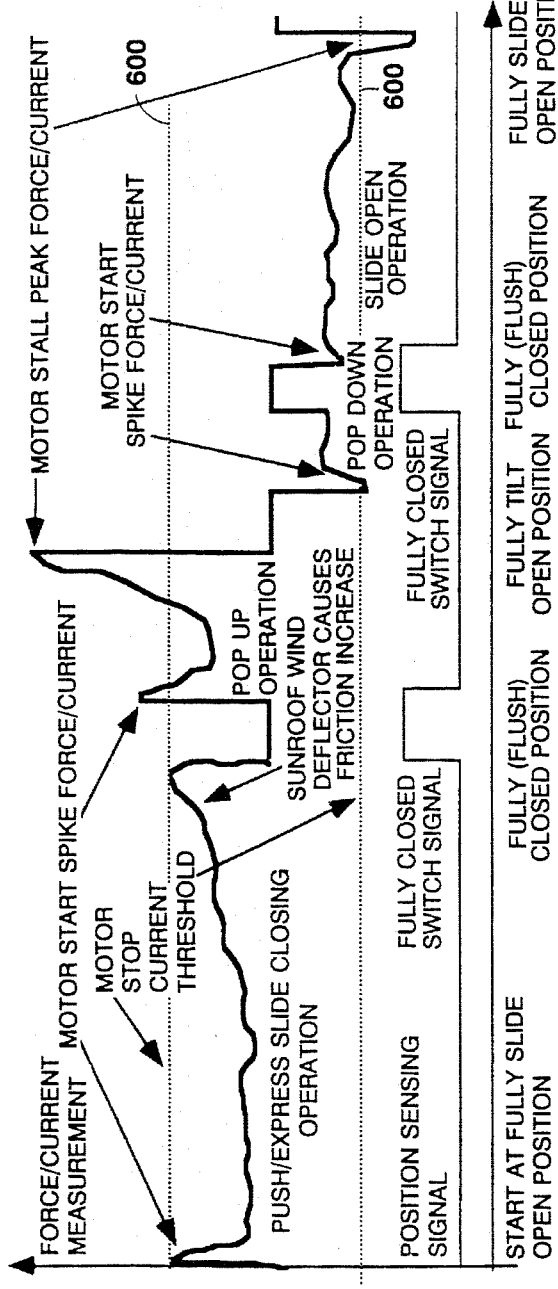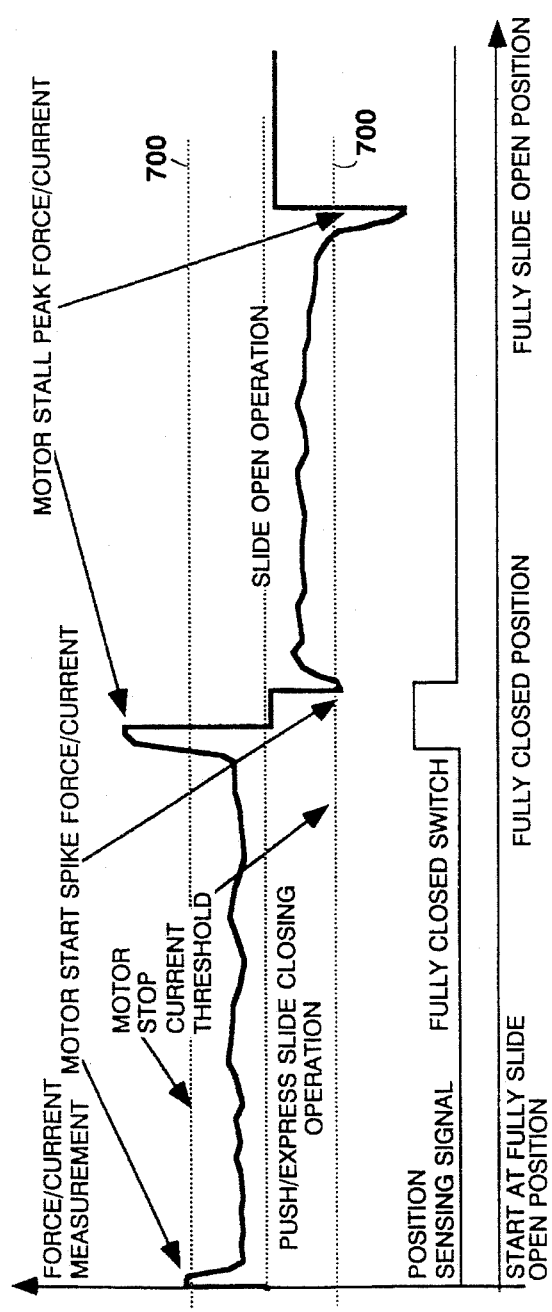

AUTOMATIC VENTING SYSTEM FOR A VEHICLE WITH OBSTRUCTION DETECTION UTILIZING DYNAMICALLY MODIFIED THRESHOLDS

This application is a continuation of U.S. patent application Ser. No. 08/227,198 filed Apr. 13, 1994, now U.S. Pat. No. 5,399,950; which is a continuation of application Ser. No. 08/030,665 filed Mar. 12, 1993, now abandoned.

FIELD OF THE INVENTION

The invention is a system that provides dynamic obstruction detection for an automatic venting system of a vehicle utilizing dynamically modified thresholds.

BACKGROUND OF THE INVENTION

Several attempts have been made in the prior art to automatically ventilate a vehicle or an enclosed space. One such system is described in U.S. Pat. No. 4,852,469 for an "Automatic Venting System" issued to Chuang, and incorporated herein by reference. The system accomplishes ventilation by opening one or more of the vehicle vents, eg. the windows, sun roof or convertible top, when the temperature inside the vehicle is higher than a desired level. In addition, if precipitation is sensed, the system automatically shuts the open vents. U.S. Pat. No. 5,054,686 for an "Automobile Environment Management System" also issued to Chuang, and incorporated herein by reference, discloses further improvements to the automatic venting system, and includes safety features such as passive infra-red living being detection.

Unfortunately, the prior art systems operate so as to close the open vents of the vehicle in response to a predetermined condition, such as precipitation detection, regardless of whether or not the vehicle is occupied. Accordingly, if a child, pet or other living being remains in the vehicle and accidently places their fingers, arm or other objects in the vents opening space during the closing operation, unacceptable injury or damage may occur.

Conventional vent closing systems provide various approaches to solving safety problems during vehicle ventilation closing operations. However, due to the technology limitations, the conventional systems are either not adequate to provide safety security or too cumbersome and expensive to be installed and operated, or both. Typically, this is due to the use of a system involving the comparison of operating currents to fixed thresholds or simply detecting an occurrence of a motor stall current level.

SUMMARY OF THE INVENTION

It is therefore an object of the invention to provide obstruction detection capabilities for an automatic venting system in a vehicle by utilizing dynamically modified thresholds.

It is another object of the invention to provide obstruction detection for an automatic venting system by monitoring the conditions of ripple currents present in the operating current of the vent motor.

Accordingly, a first preferred embodiment of the present invention is motor control system for controlling operation of an electric motor associated with a motor-operated vent in a vehicle. The system includes means for providing an operating current to the motor, means for monitoring and storing data relating to the operating current, means for detecting the occurrence of abnormal loads applied to the vent by determining whether the monitored operating current exceeds at least one predetermined threshold, means for dynamically modifying the at least one predetermined threshold in accordance with monitored condition variations of the operating current, and means for altering the operating current provided to the motor in response to the detection of an abnormal load detection.

According to another preferred embodiment, there is provided a motor control system for controlling operation of an electric motor associated with a motor-operated vent in a vehicle. The system includes means for providing an operating current to the motor, means for monitoring and storing data relating to the operating current, means for monitoring and storing data relating to ripple current waves associated with the operating current, means for detecting the occurrence of abnormal loads applied to the vent by determining whether the frequency of the monitored ripple current waves is less than a predetermined value, and means for altering the operating current provided to the motor in response to the detection of an abnormal load detection.

BRIEF DESCRIPTION OF THE DRAWINGS

FIG. 6 shows a force/current measurement timing diagram for a slide and tilt sun roof operation;

FIG. 7 shows a force/current measurement timing diagram for a window or convertible top closing operation;

DETAILED DESCRIPTION OF THE ILLUSTRATED EMBODIMENTS

Figure 1:
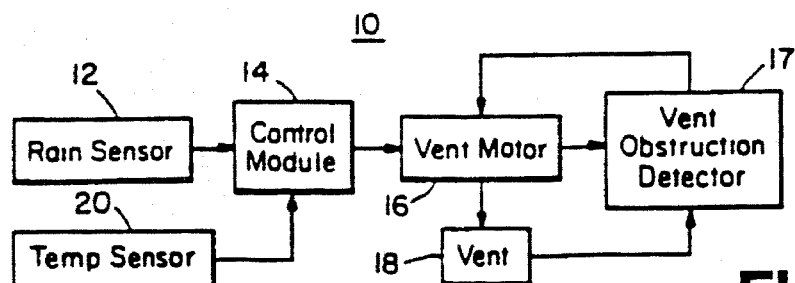
FIG. 1 shows a block diagram of an automatic venting system in accordance with the present invention.

With reference now to FIG. 1, an automatic venting system 10 according to the present invention is shown. The system 10 is designed for use in a vehicle such as an automobile. The system includes a control module 14 which is responsive to a temperature sensor 20 placed in the interior of the car, and a precipitation sensor 12 placed on the exterior of the car. The temperature sensor 20 supplies a signal to the control module 14 relating to the vehicle interior temperature, and the precipitation sensor 12 detects the presence of water to send a signal to the control module indicating that there is precipitation falling outside the car.

The system 10 is adapted for use with automobiles which include one or more vents, such as windows, sun roof and/or a convertible top, each of which is operated by a vent motor such as motor 16. As will be described in more detail hereinafter, the system 10 automatically enables motor 16 to open vent 18 at least partially when temperature sensor 20 senses an unacceptably high temperature in the interior of the vehicle. When precipitation is sensed by sensor 12, the control module 14 enables motor 16 to close the vent. Vent obstruction detector 17 determines if the vent is obstructed and if so, control module 14 reverses the motor 16 to back the vent off the obstruction. The window closure may be attempted one or more times before the control module 14 leaves the window in at least a partially open state so that the obstruction may be removed.

The obstruction detector 17 may be accomplished with a switching device placed at the end of the closing path of the vent 18 to signal when the vent is closed used in combination with either a timing circuit or a vent motor stall current detector. When a timing circuit is employed, the obstruction detector 17 signals an obstruction if the switch is not closed within the normal window closure time. Alternatively, the vent motor stall current detector may be employed to signal when the motor is drawing a higher than normal current, indicating that the window path is obstructed. In that case, since the vent motor may briefly draw such high current when the window closes, obstruction detection is accomplished by employing the stall current detector in conjunction with a window limit switch placed at the window closed position, which indicates that the window is fully closed rather than obstructed. In any case, the inclusion of vent obstruction detector 17 prevents the window from closing on and injuring a child or an animal and also prevents vent motor 16 from burning out.

Figure 2:
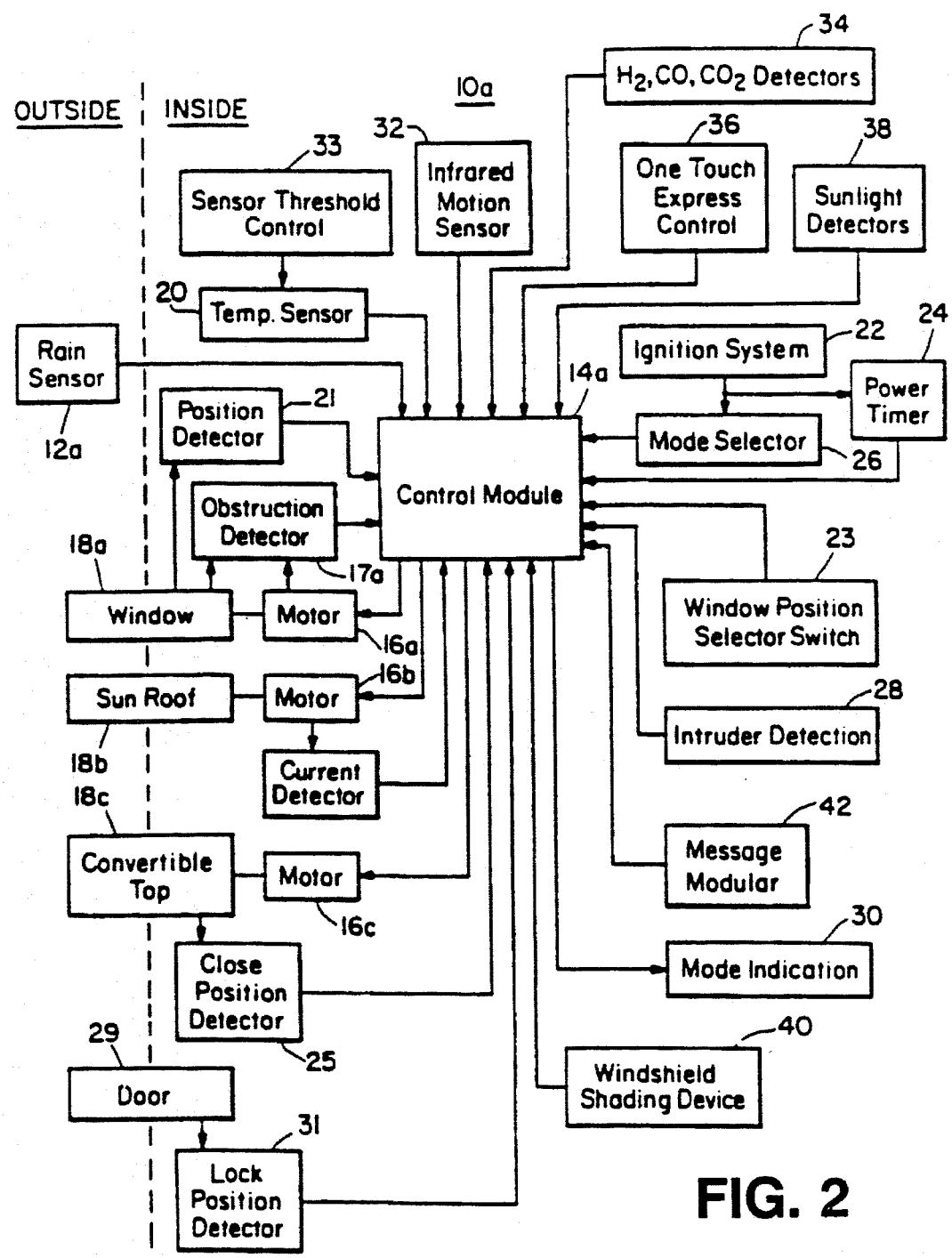
FIG. 2 shows a more detailed block diagram of the automatic venting system.
Figure 3A:
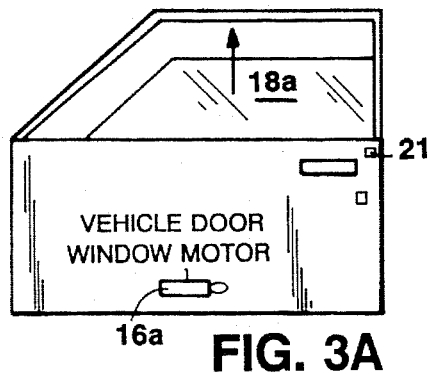
FIGS. 3A and 3B respectively show a diagrammatic view of a window during a closing operation and a corresponding current measurement timing diagram.
Figure 3B:
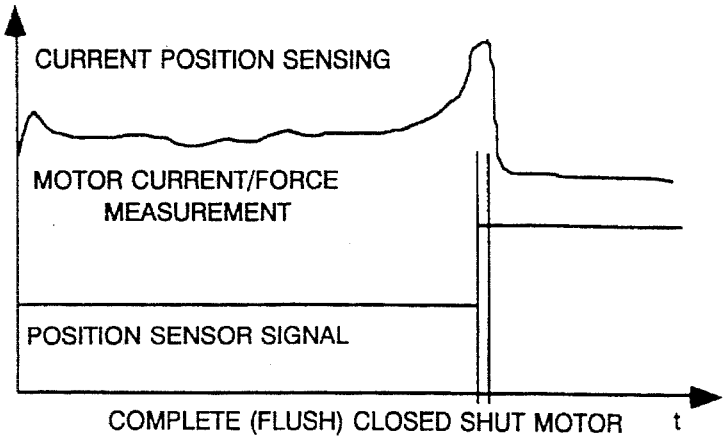

A much more detailed embodiment of the system 10 according to the present invention is schematically depicted in FIG. 2. In this embodiment, the vehicle includes window 18a, sun roof 18b, convertible top 18c and door 29 which span the dividing line between the inside of the car and the outside of the car. Window obstruction detector 17a is responsive to window 18a and/or window motor 16a as described above for, either singly or in combination with window position detector 21, enabling the control module 14a to open the window if an obstruction is detected and attempt window closure one or more times before halting the attempts to prevent motor 16a from burning out. It should be understood that such obstruction detection may also be provided for sun roof 18b and/or convertible top 18c. In the event that obstruction detection is accomplished with a timing circuit, closed position detector 25 may be employed without the need for an obstruction detector such as that shown at 17a.

The system 10 is enabled by switching the ignition key of ignition system 22 to the off position. The operator of the vehicle is then allowed to select from one or more different operation modes employing mode selector switch 26. Selection of a particular mode is confirmed either audibly or visually by mode indication unit 30.

Once the system is enabled, a timer 24 permits operation of the system for a preselected period of time, after which all vents are closed and the system is disabled. Similarly, intruder detection module 28 provides for immediate closure of all open vents when unauthorized vehicle entry is detected after all the doors to the vehicle have been locked as indicated by lock position detector 31. The intruder detection may be accomplished by using one or more of the infra-red and motion sensors 32 which may include an interior infra-red sensor for detecting the presence of a warm body (living being) in the vehicle.

The system 10 also includes sunlight detectors 38 for enabling the operation of automatic window shades, which help to keep the interior of the vehicle cool. The system may also include one or more dangerous gas detectors 34. The control module 14a is enabled to immediately open one or preferably all of the vehicle vents and keep them open until the level of dangerous gas detected has subsided.

The system 10 may also include message modular 42 for providing audio messages, such as voice message for indicating when a particular operating mode has been selected or when one or more of the vents is about to be operated. One touch express control 36, allows the user to open or close all the car windows with a single touch of window position selection switch 23. The control 36 may also be used to allow the user to program the amount each of the vents is to be opened during automatic system operation.

With reference now to FIGS. 3–7, the operation of the obstruction detector 17 as a current load detector is described. FIG. 3A shows a diagrammatic view of the window 18a during the closing operation, and FIG. 3B shows the associated current measurement timing diagram illustrating both the motor current measurement and the positioned sensor signal provided from the position detector 21. This will be appreciated those of skill in the art, the position detector 21 provides a reference point for the control module 14a as an indication of when the window is in a fully closed position, while the current detection allows the control module to sense the varying conditions of the motor current while the window either reaches the complete open position or is blocked by an obstruction.

Figure 4A:
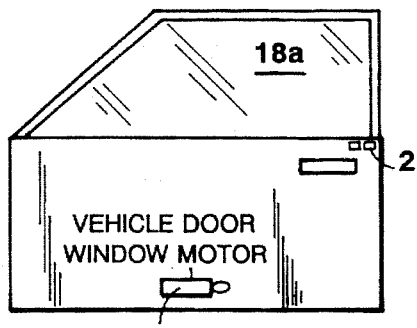
FIGS. 4A and 4B respectively show a diagrammatic view of the window in the fully closed position and the corresponding current measurement timing diagram.
Figure 4B:
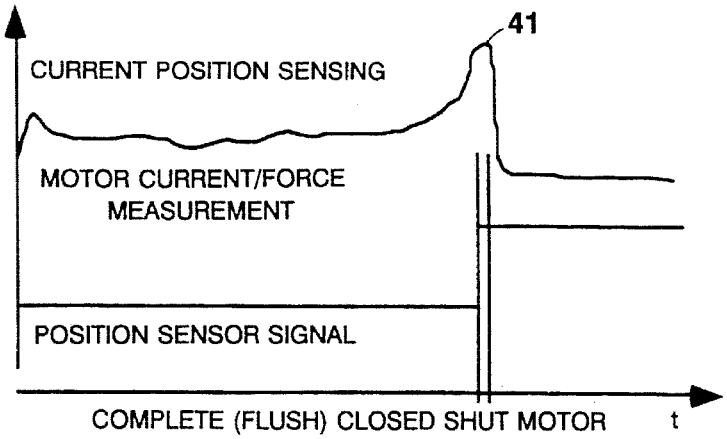

During the operation as shown in FIGS. 4A and 4B, when the window is in a completely closed position without obstruction, the increased load of motor current occurs approximately simultaneously with the position sensor signal at 41 indicating that the window has come to a complete closed position. Furthermore, during the closing operation situations when the vent or window is not yet in the fully closed position (i.e. no position sensor signal) if the motor current measurement varies from a predetermined operational range, the control module considers it as an obstruction detected signal.

Figure 5A:
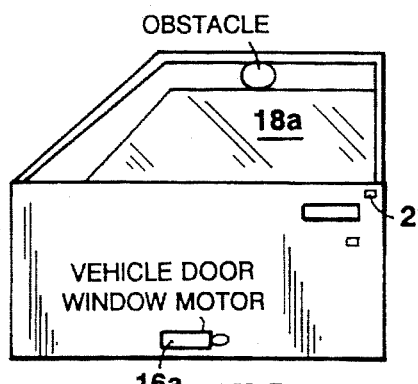
FIGS. 5A and 5B respectively show a diagrammatic view of the window with an obstacle impeding the closure thereof and the corresponding current measurement timing diagram.
Figure 5B:
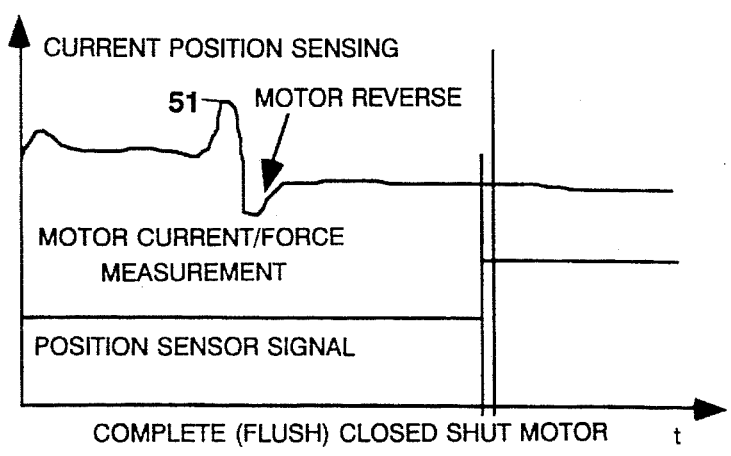

As shown in FIGS. 5A and 5B, when an obstacle impedes the closure of the window, increased current load is sensed at 51 and the vent motor is either immediately shut off or reversed in order to avoid damage to the obstruction. The amount of current supplied to the vent may be adjusted according to desired specifications. For example, a vent may be reversed to a position of 200 millimeters or to a fully opened position, or reversed to the same position as the vent was in when it started the closing operation.

In situations where the obstruction force is very small, for instance 22 pounds or less, the system which uses fixed current thresholds is often unable to accommodate the requirement of detecting such abnormal loads. This can be quite significant considering that the small limbs of a child or animal often do not generate more than 22 pounds of load on the vent. In FIGS. 6 and 7, a slide and tilt sun roof operation, and a window and/or convertible top closing operation force/current timing analysis diagrams are shown, respectively. In both analytical systems, a predetermined fixed threshold 600, 700 is utilized to detect whether the operation current of the vent motor exceeds the threshold in the periods between the start of the motor and the closed or open positions of the vent.

In addition, these systems are ineffective in cases where resistances develop due to the wear and tear of the vent, such as the change of vent track friction. If the preset thresholds are too low, typically the vent either cannot be automatically closed the entire way, or a few months following the installation of the vent in the vehicle, the track friction increases or the lubrication decreases, thus the vent will not be able to automatically close the entire way. On the other hand, if the preset threshold is too high, the system will simply not be able to detect the fully open position or the obstruction.

Figure 8:
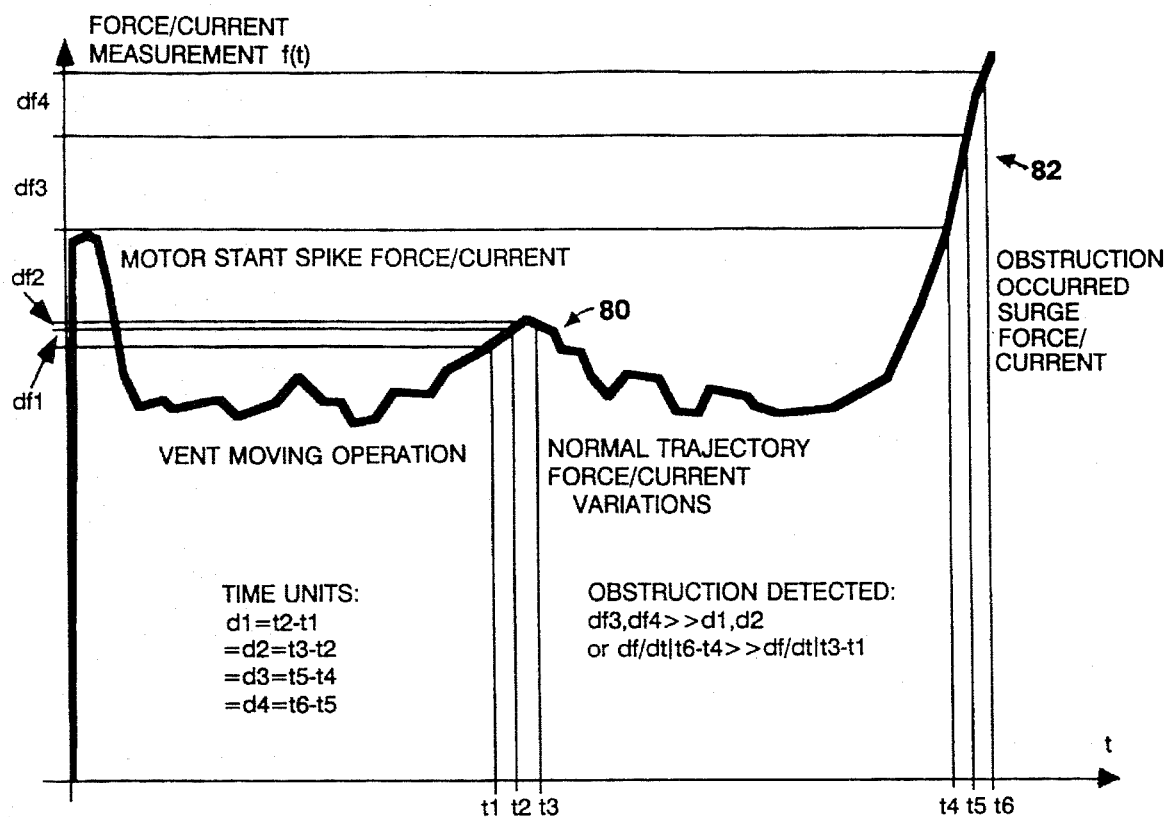
FIG. 8 shows a force/current measurement timing diagram with a graph of the characteristics of the operation current of a vent motor.
Figure 9:
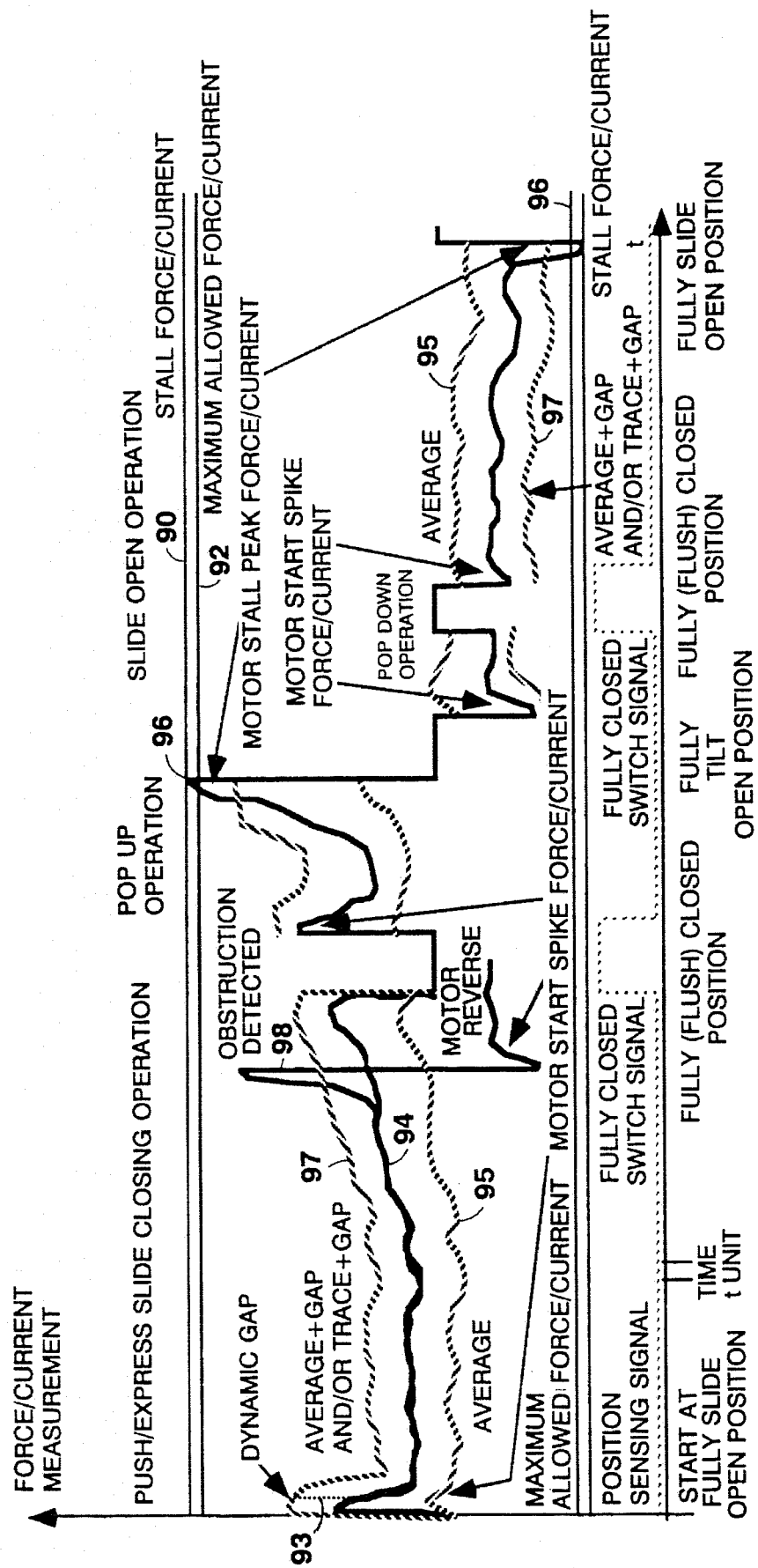
FIG. 9 shows a force/current measurement timing diagram utilizing the dynamically modified thresholds in accordance with the present invention.

With reference now to FIG. 8, a graph of exemplary current trajectory characteristics of the vent motor operation current is shown. It will be appreciated that during the normal trajectory current variations at 80, the operation current will rise or fall much slower than the current characteristics associated with the detection of an obstruction or the fully open/closed position of the vent at 82. For instance, the force/current derivatives ∂f3, ∂f4 which are associated with the obstruction or vent stoppage condition are much larger than the derivatives ∂f1, ∂f2 which corresponds to the normal operation current trajectory.

Based on the current trajectory analysis of FIG. 8, the system of present invention utilizes dynamically changing thresholds. The motor control system according to the present invention operates to detect the occurrence of abnormal loads applied to a motor operated vent by determining whether the monitored operating current exceeds at least one of several predetermined thresholds. As will be described in more detail hereinafter, the system also operates to dynamically modify the predetermined thresholds in accordance with condition variations in the operating current of the vent motor. Accordingly, when the system detects an abnormal load on the vent, the operating current is altered so as to stop or reverse the vent operation.

With particular reference to FIGS. 9 and 10A–10C, respectively illustrating an operation current timing diagram and an associated process flow chart, a preferred embodiment of the present invention is described. In order for such a system to be adaptable to various vehicles which may use different vent motors having varying electrical specifications, upon the first start up, the system is initialized to predetermined default settings relating to the current threshold, average operating current, and a current gap value (step 100). These default settings are preferably provided via an EEPROM associated with the control module 14A of the system so as to fairly proximate the operating characteristics of the vent motors used in the particular vehicle in which the system is installed.

A determination is made by the control module as to the value of the ultimate initial threshold 90 of the system, the stall current $I_{STALL}$ of the vent motor (step 102). In this first preferred embodiment, all of the thresholds depend on and vary in accordance with the initial setting and the changing value of $I_{STALL}$. As described with reference to step 100, the stall current is initially set to a predetermined default value. Upon the initial operation of the system, the stall current $I_{STALL}$ is measured when the associated vent is first opened to its fully opened position. Thereafter, the value of $I_{STALL}$ may be modified in accordance with, among other conditions, each time the vent reaches its fully opened position as there typically will be no obstructions occurring during the vent opening operation.

A second threshold 92 of lesser value than the stall current threshold, is a value associated with the maximum allowed current $I_{MAX}$. The threshold $I_{MAX}$ serves to avoid the motor current from reaching the levels of $I_{STALL}$ during normal closing procedures when an obstruction or abnormal load is applied to the vent. At step 104, $I_{MAX}$ is calculated as a predetermined percentage of $I_{STALL}$. For example, $I_{STALL}$ may be multiplied by a constant x, wherein x has a value less than 1. Thus, $I_{MAX}$ is modified every time $I_{STALL}$ changes. For instance, at the end of the opening operation the control module continues to apply current to the vent motor for a short period to guarantee that a stall current occurs. Thereafter, the stall current is stored and used to modify the previously stored $I_{MAX}$. In order to avoid accidental drastic alternations of the detected stall current that could lead the system to fluctuate the value of $I_{MAX}$ suddenly, the value of $I_{MAX}$ is preferably at least 75% of the determined $I_{STALL}$ value.

At step 106, a current gap value $I_{GAP}$ 93 is calculated. The value of $I_{GAP}$ is utilized by the control module for setting other thresholds to be described hereinafter. Initially, as described with reference to step 100, the system sets the current gap to a predetermined value. Thereafter, the $I_{GAP}$ is calculated to be proportionately associated with the $I_{STALL}$ value. For instance, $I_{STALL}$ may be multiplied by a constant y which is less than both the constant x utilized in calculating $I_{MAX}$ and 1. Therefore, $I_{GAP}$ will also be modified in accordance with changes to the $I_{STALL}$ value.

The system proceeds, at step 108 by measuring the operating current $I_{OP}$ 94 supplied to the vent motor. During the measurement of the operating current, the control module operates to both store and update values associated with a dynamic average measurement 95 of the operating current $I_{AVG}$ and a time incremental storage of the operating current $I_{TRACE}$. Both $I_{AVG}$ and $I_{TRACE}$ are constantly updated during vent operation, and frequently at very short time intervals.

Starting at step 112, the system begins comparisons between the operation current $I_{OP}$ and the dynamically modified thresholds. At step 112, a determination is made as to whether $I_{OP}$ is less than the stall current value $I_{STALL}$. If $I_{OP}$ is not less than $I_{STALL}$ (e.g., $I_{OP}$ exceeds $I_{STALL}$), the system proceeds to step 114 where the control module alters the operation current supplied to the vent motor. The altering of the motor current may take the form of either reversing the motor current so as to reverse the vents opening or closing procedure a predetermined time period or to a predetermined position. Alternatively, the control module may simply stop the supply of operation current to the motor, thus stopping movement of the vent. This occurrence of the operation current $I_{OP}$ is diagrammatically illustrated at 96 of FIG. 9. Following the alteration of the motor current at step 114, the process returns to step 102 for a determination of the $I_{STALL}$ value. In this situation, $I_{STALL}$ will remain the same rather than increasing to any levels of $I_{OP}$ which exceed $I_{STALL}$.

If at step 112, $I_{OP}$ is determined to be less than $I_{STALL}$, a second determination is made at step 116 as to whether the operating current $I_{OP}$ is less than the maximum current threshold $I_{MAX}$. In cases where $I_{OP}$ exceeds $I_{MAX}$, the system operates to alter the motor current at step 114, and described in more detail above, and returns to the process at step 102 for a determination of a new value for $I_{STALL}$. In this case, when the value of $I_{OP}$ is greater than the threshold of $I_{MAX}$ and less than the $I_{STALL}$ threshold, the system saves that value of $I_{OP}$ as the new $I_{STALL}$ value. Accordingly, the remainder of the thresholds are also modified in accordance with the new value of $I_{STALL}$. The condition of $I_{OP}$ exceeding $I_{MAX}$ is also diagrammatically illustrated, for example, at 96 of FIG. 9.

If the determination is made at step 116 than $I_{OP}$ is less than $I_{MAX}$, a further determination is made at step 118 as to whether $I_{OP}$ is less than a third threshold 97 corresponding to the sum of the value of the dynamic average measurement of the operation current $I_{AVG}$ and the calculated gap value $I_{GAP}$. This threshold provides the system with a fine tuned obstruction detection for those loads applied to the vent which are more difficult to detect. Thus, $I_{AVG}$ serves as a storage of the complete trajectory history of the operation current and, therefore, if the operation current measurement is larger than this corresponding historical trajectory point by the $I_{GAP}$ value, the system considers an obstruction to be detected as at 98 of FIG. 9. Accordingly, when $I_{OP}$ exceeds the sum of $I_{AVG}$ and $I_{GAP}$, the motor current is altered at step 114 and the system proceeds to return to step 102.

In cases where $I_{OP}$ is determined to be less than $I_{AVG}+I_{GAP}$, a final determination is made at 120 as to whether the operating current $I_{OP}$ is less than a final threshold corresponding to the value of $I_{TRACE}$ plus the gap current value $I_{GAP}$. A more detailed description of this final threshold is described with reference to FIG. 11.

Figure 11:
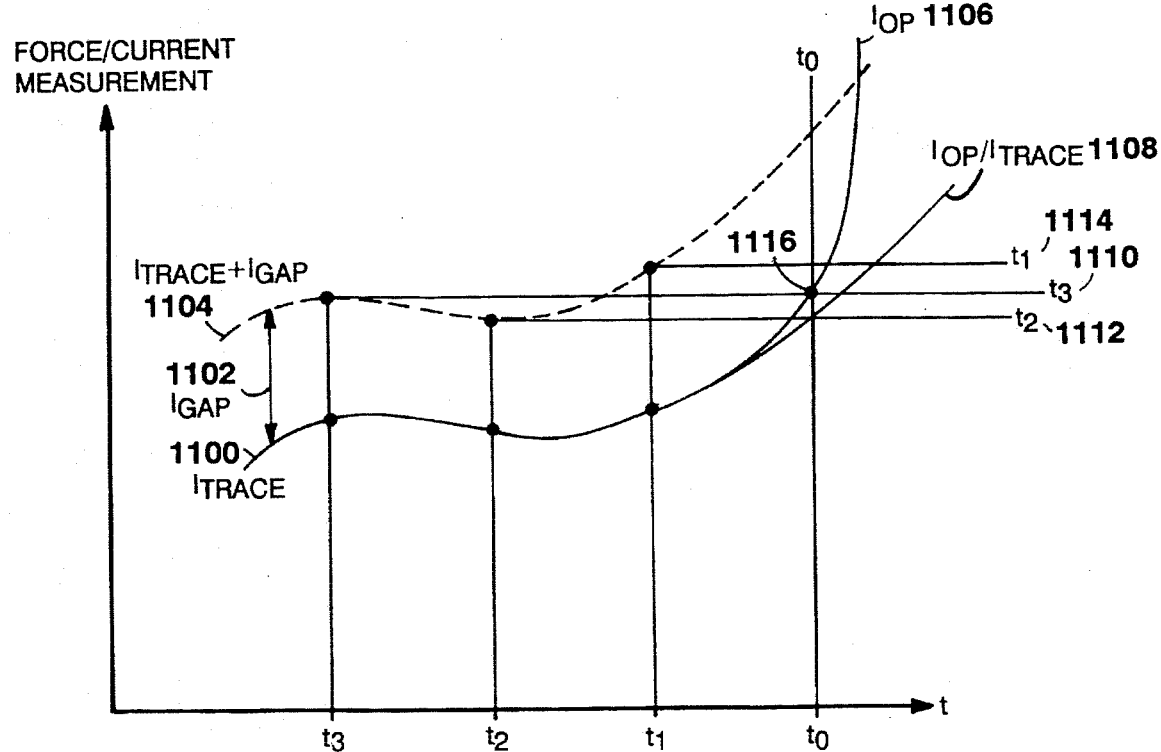
FIG. 11 shows a force/current measurement timing diagram illustrating the use of a threshold $I_{TRACE}+I_{GAP}$ in accordance with the present invention.

In FIG. 11, a detailed view of the current measurement timing diagram of $I_{OP}$ is shown with respect to the use of the final threshold $I_{TRACE}+I_{GAP}$. The $I_{TRACE}$ values 1100 correspond to previously measured values of $I_{OP}$ 1108 occurring at predetermined time increments. For example, the control module may store a predetermined number of values of $I_{OP}$ occurring at a specified number of time increments prior to the currently monitored $I_{OP}$. As shown in FIG. 11 for exemplary purposes, a total of three time incremental values for $I_{TRACE}$ are stored. Thereafter, the calculated gap value $I_{GAP}$ 1102 is added to each of the $I_{TRACE}$ values at the predetermined time increments in order to obtain the threshold $I_{TRACE}+I_{GAP}$ values 1104.

The system proceeds to measure whether the $I_{OP}$ value exceeds the threshold set by $I_{TRACE}+I_{GAP}$ corresponding to a predetermined previously occurring time incremental value. In this example, the control module is set to utilize the threshold occurring at the $I_{TRACE}$ value at $T_3$ corresponding to three previous time incremental values prior to the presently monitored operation current value occurring at $T_0$. Accordingly, if $I_{OP}$ (at 1106) suddenly increases or decreases to a level which exceeds the threshold 1110 associated with the incremental value of $I_{TRACE}+I_{GAP}$ at $T_3$, an object is determined to be detected, and therefore the motor current will be altered. As shown in FIG. 11, this occurrence is detected when $I_{OP}$ 1106 crosses the threshold 1110 at the point 1116. It will be appreciated that a corresponding threshold level $I_{TRACE}+I_{GAP}$ is monitored for negatively swinging fluctuations in the operation current being monitored.

Returning to FIG. 10B, if at step 120 the operation current $I_{OP}$ is determined to be less than the threshold $I_{TRACE}+I_{GAP}$, the procedure returns to step 108 for a continual measuring of the operating current.

Figure 10A:
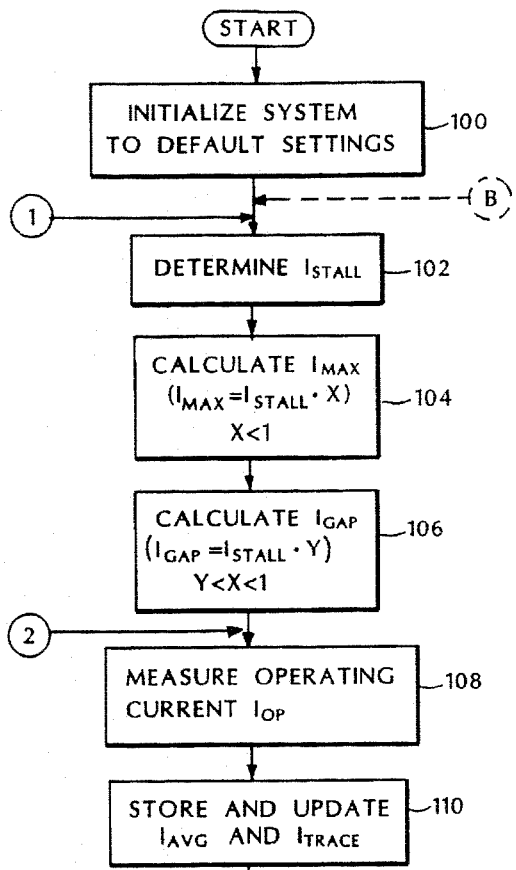
FIG. 10A–10C show a flow chart of a first preferred embodiment of the system utilizing dynamically modified thresholds.
Figure 10B:
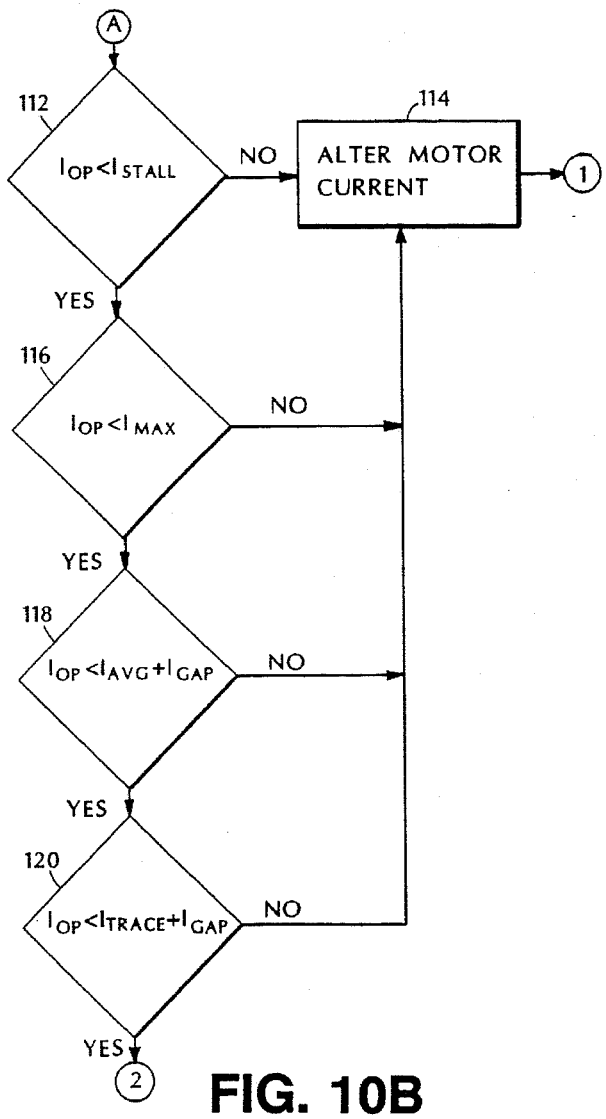
Figure 10C:
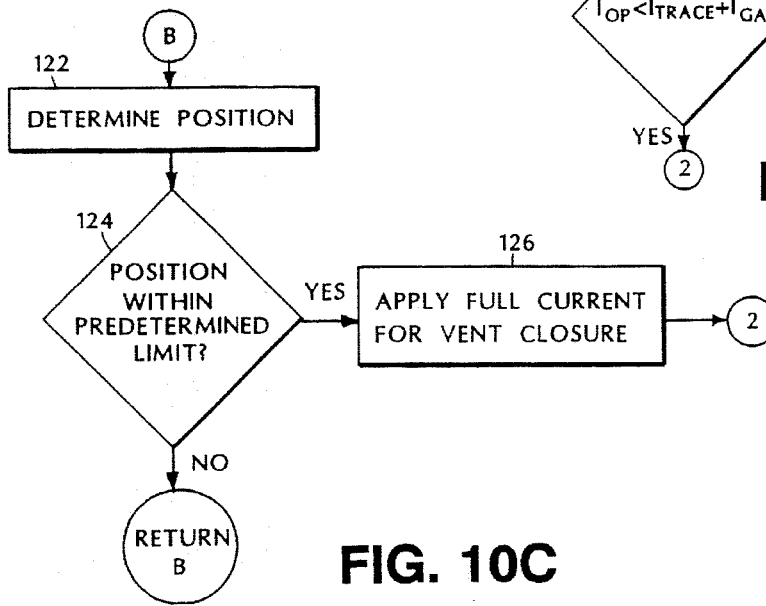

In more complicated cases, if the closing operation of the vent requires extra force at the end of the closing operation to insure the tight closure of the vent, the system will preferably incorporate position detection so as to detect the position of the vent just prior to a full closing point, thus allowing the control module to apply full force to perfect the closure of the vent. With reference now to FIG. 10C, a subroutine B for the procedure of FIGS. 10A and 10B is shown.

At B, a step 122 is provided for determining the specific position of the vent during the closing operation. At step 124, a determination is made as to whether the vent position is within a predetermined limit. This predetermined limit may be specified to correspond to a vent position which would not accommodate an object obstructing the remaining path of the vent. For instance, a limit of 4 millimeters would essentially preclude any limb associated with a child or animal from becoming an obstruction in the vent's path. If it is determined that the position is not within the predetermined limit, the subroutine returns to the normal process at step 102. If the vent position is determined to be within the predetermined limit, the system proceeds at step 126 to apply full current to the vent motor for perfecting the vent closure, thus ignoring all preestablished thresholds. Thereafter, the system returns to step 108 for measuring the operation current of the vent motor.

Figure 12:
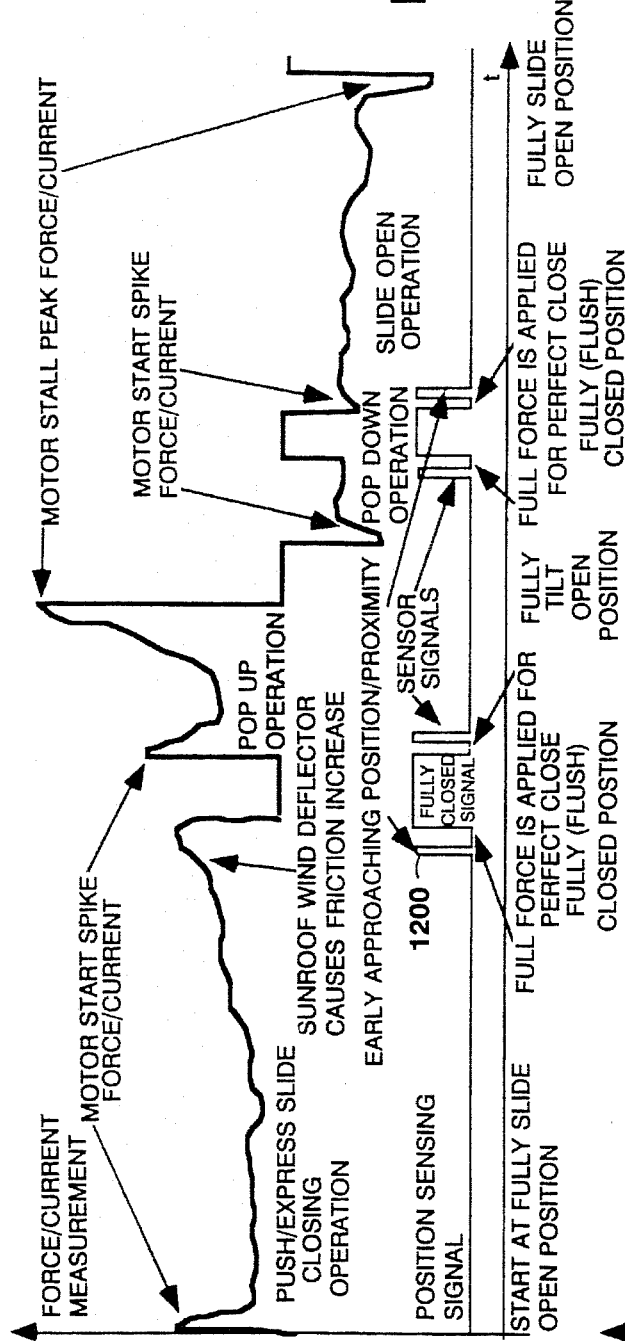
FIG. 12 shows a force/current measurement timing diagram for a slide and tilt sun roof utilizing an early position detection technique in accordance with the present invention.
Figure 13:
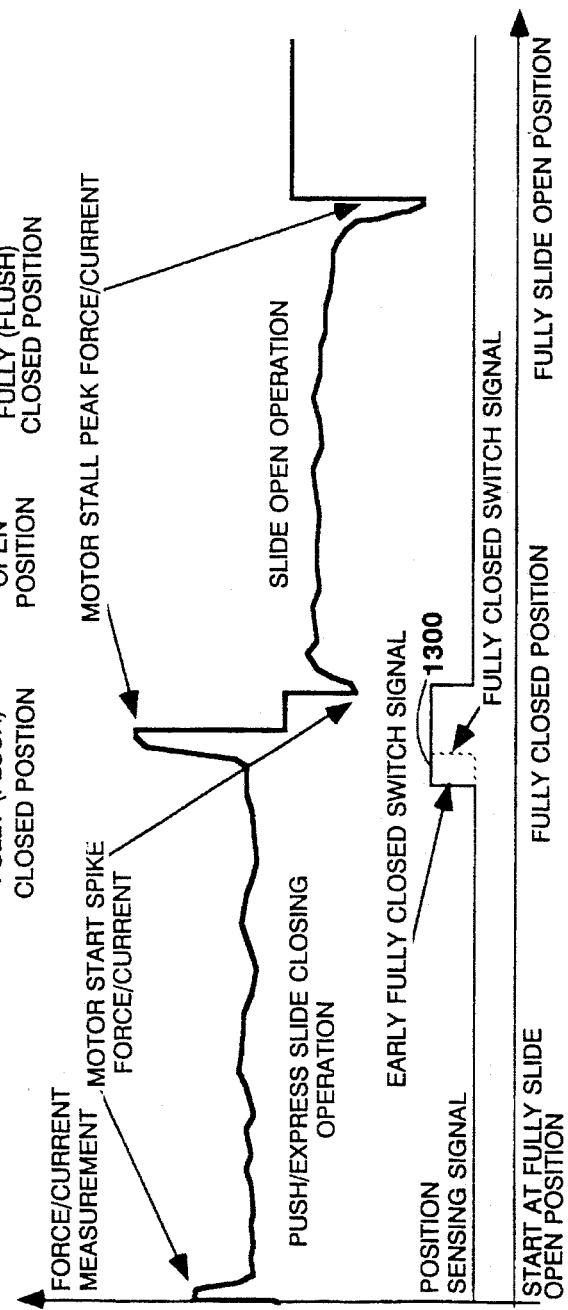
FIG. 13 shows a force/current measurement timing diagram for a window utilizing an early position detection technique in accordance with the present invention.

With reference to FIGS. 12 and 13, the operation current measurement timing diagrams for both a slide and tilt sun roof operation and window and/or convertible top operation, respectively, are shown. The diagrams illustrate the use of an early position signal 1200, 1300 for operation in accordance with FIG. 10C.

Figure 14A:
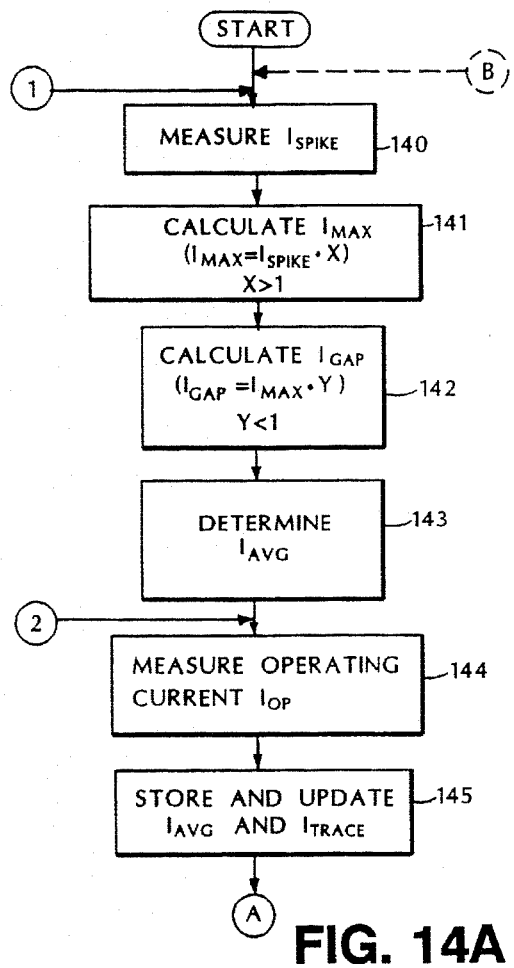
FIGS. 14A–14C show a flow chart of a second preferred embodiment of the present invention utilizing dynamically modified thresholds.
Figure 14B:
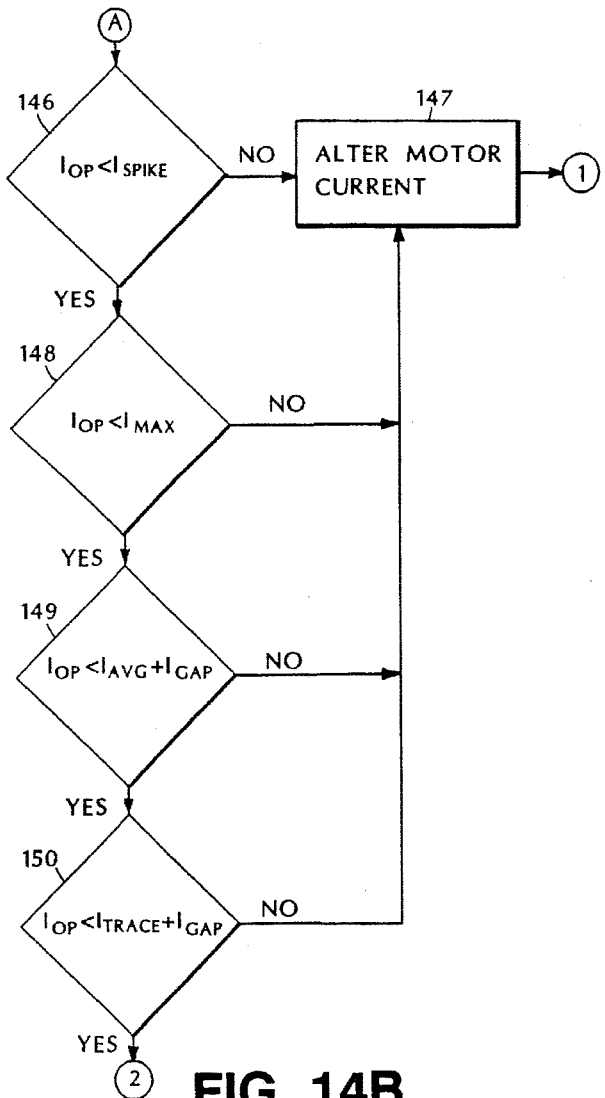
Figure 14C:
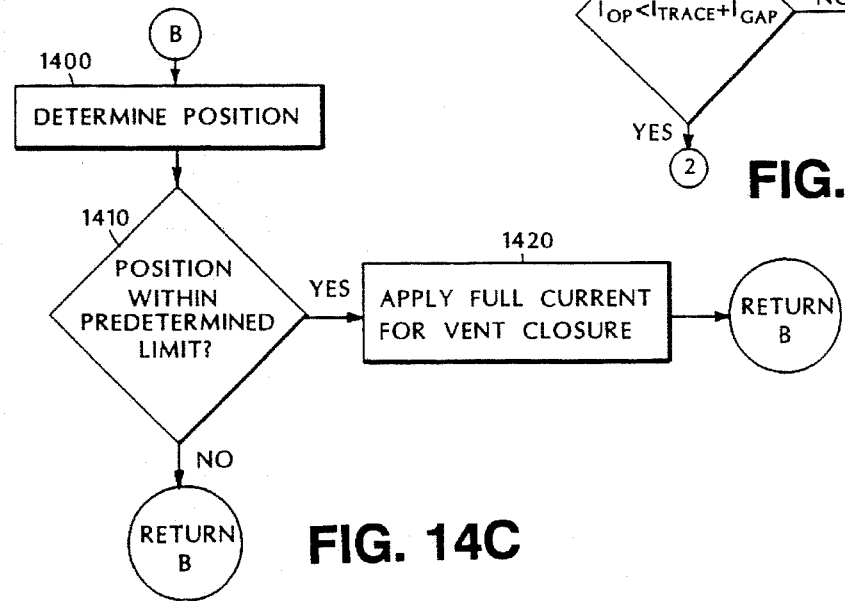

With reference now to FIGS. 14A–14C, an alternate embodiment of the present invention is described. The alternate system operation is similar to that disclosed with reference to FIGS. 10A–10C, in that the process involves the use of dynamically modified predetermined thresholds to detect obstructions in the vent's path or abnormal load detection applied to the vent.

At step 140, the system measures the starting spike current which occurs every time the vent motor is started. The control module of the system measures and stores the spike current as $I_{SPIKE}$, which serves as the basis for the remaining thresholds utilized in this process. As was described with reference to FIGS. 10A–10C, the initial value settings for this system may also be provided by the use of EEPROM associated with the control module. A considerable advantage of basing the dynamic thresholds on the $I_{SPIKE}$ measurement is that it provides the solution to problems associated with such systems utilized at a cold start. Such a system is beneficial particularly when it is unclear as to what position the vent will be in when the system is turned on, and operates irregardless of what kind of vent motor and associated mechanical structure of the vent element is utilized in the vehicle.

The process proceeds to step 141 where a maximum current threshold $I_{MAX}$ is calculated. $I_{MAX}$ is preferably calculated to be a value corresponding to $I_{SPIKE}$ times a constant x, wherein x is greater than 1. $I_{MAX}$ is preferably larger than $I_{SPIKE}$ because typically the stall current of the vent motor is larger than the starting spike associated with the same motor. At step 142, a current gap value $I_{GAP}$ is calculated. $I_{GAP}$ is preferably equal to the previously calculated $I_{MAX}$ value times a constant y, wherein y is less than 1.

At step 143, the control module determines an initial value for the dynamic average measurement of the operating current $I_{AVG}$. The value $I_{AVG}$ may be initially preset from a prestored value and thereafter modified in accordance with the operation of the vent motor. The operating current $I_{OP}$ is measured at step 144, and at step 145, the $I_{AVG}$ value and $I_{TRACE}$ are stored and updated for every operation of the vent motor.

Starting at step 146, the system begins comparing the operation current $I_{OP}$ to the predetermined thresholds. At step 146, a determination is made as to whether the operation current $I_{OP}$ is ess than the value of $I_{SPIKE}$. If $I_{OP}$ exceeds $I_{SPIKE}$, the control module commands an alteration of the motor current at step 147. Thereafter, the process returns to step 140 for measuring subsequent values of $I_{SPIKE}$.

If $I_{OP}$ is determined to be less than $I_{SPIKE}$, the operation current $I_{OP}$ is then compared to the threshold $I_{MAX}$. If $I_{OP}$ exceeds $I_{MAX}$, the process proceeds to step 147 for altering the motor current. Otherwise, if $I_{OP}$ is determined to be less than $I_{MAX}$, a determination is made at step 149 as to whether the operating current $I_{OP}$ is less than the threshold corresponding to the value $I_{AVG}+I_{GAP}$. If $I_{OP}$ exceeds this third threshold, the system proceeds to step 147 where the motor current applied to the vent motor is altered.

If $I_{OP}$ is determined to be less than the sum of $I_{AVG}$ and $I_{GAP}$, a final threshold determination is made at step 150. At step 150, $I_{OP}$ is compared with the final threshold $I_{TRACE}$ plus $I_{GAP}$. This comparison is similar to that made in connection with step 120 of FIG. 10B and described in detail with respect to FIG. 11. If $I_{OP}$ exceeds the sum of $I_{TRACE}$ and $I_{GAP}$, the system proceeds to step 147 where the motor current is altered. If $I_{OP}$ is determined to be less than this threshold, the system proceeds to return to step 144 where the operating current $I_{OP}$ is measured.

In addition, a subroutine B as shown in FIG. 14C, may be implemented prior to step 140. The operation of the subroutine B is exactly the same as the subroutine B described with respect to FIG. 10C. In other words, at step 1400 a determination is made as to the position of the event. At step 1410, a determination is made as to whether the position of the vent is within a predetermined limit. If the position is within the predetermined limit, full current is applied to the vent motor for vent closure at step 1420 thereafter, the subroutine returns to step 140.

The system operation as described with respect to FIGS. 14A–14C provides and estimation of the vent motor parameters, and further provides proper dynamic control of the vent to prevent harm or destruction to an object in the vent's path during a closing operation. Such a system may be configured as a universal fit for a series of differently configured venting products which operates correctly even upon initial system start up.

Figure 15A:
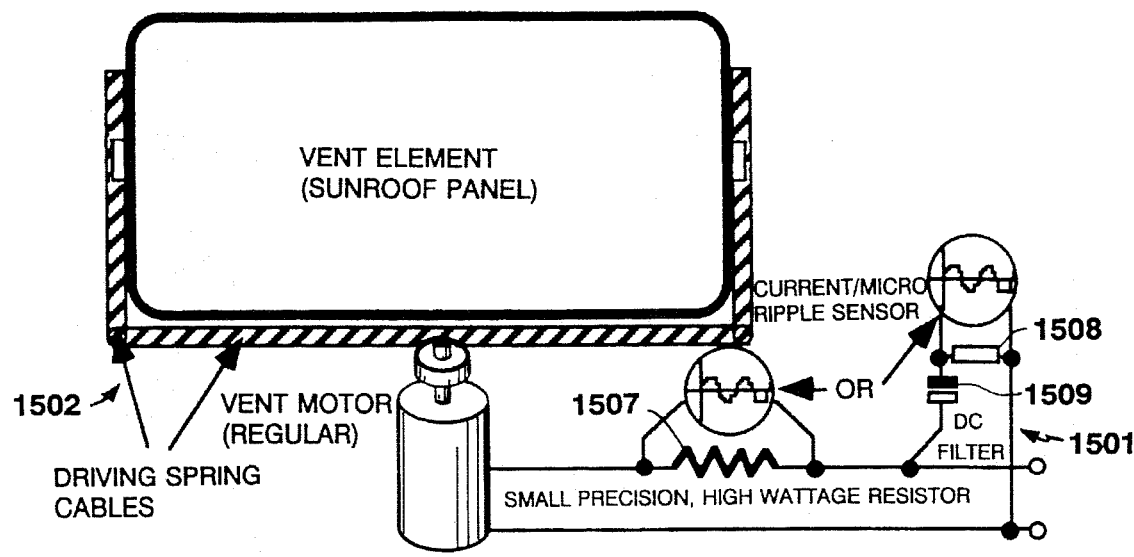
FIGS. 15A–15C show implementations of micro ripple wave current sensors in accordance with the present invention.
Figure 15B:
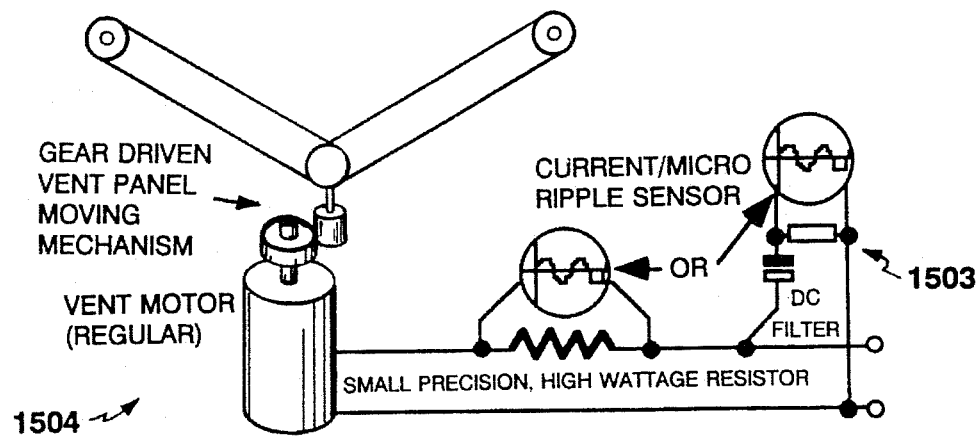
Figure 15C:
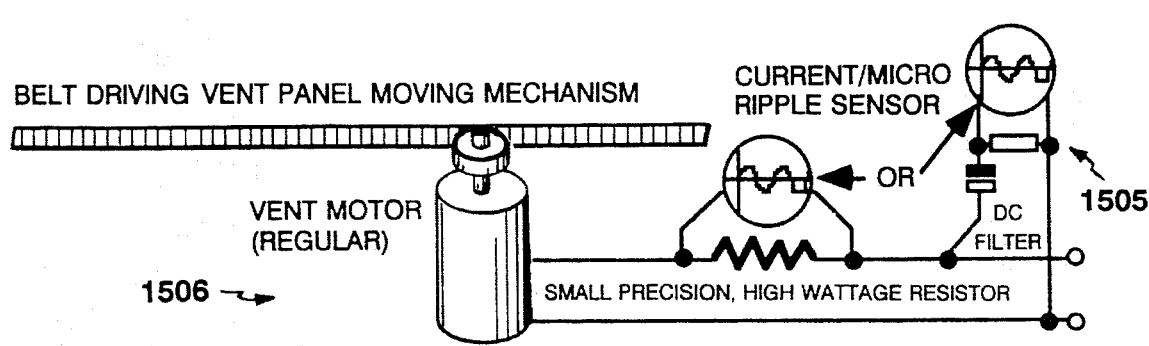

A further embodiment of the present invention for obstruction detection is described with respect to FIGS. 15 and 16. FIGS. 15A–15C illustrate alternative devices 1501, 1503, 1505 for detecting micro ripple waves occurring in the operating current supplied to the vent motor. The devices are respectively associated with driving spring cables for a sun roof panel 1502, a gear driven vent panel moving mechanism 1504, and a belt driven vent panel moving mechanism 1506. The device according to one aspect of the present invention would include a small value precision high wattage resistor 1507 placed in the current wire supplied to the vent motor for detecting micro ripple waves occurring in the operating current. Alternatively, in another aspect of the invention a current/micro ripple sensor 1508 utilized in conjunction with a DC filter 1509 directly from the power lines to the vent motor may be used to detect the electric ripple wave of the operating current.

Figure 16A:
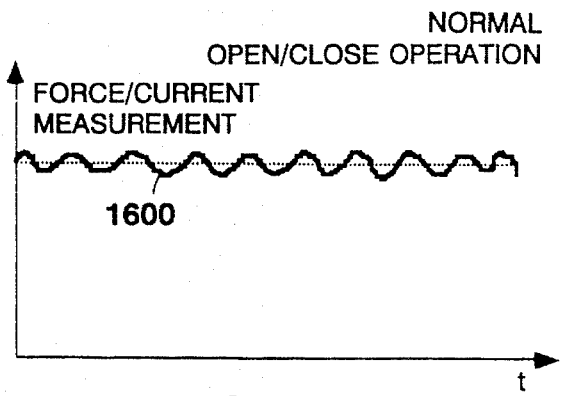
FIGS. 16A and 16B respectively show a force/current measurement timing diagram of the ripple current associated with a normal open/close operation and a corresponding processed digital waveform.
Figure 16B:
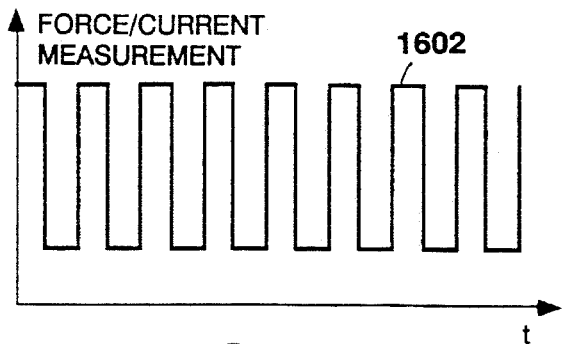
Figure 17A:
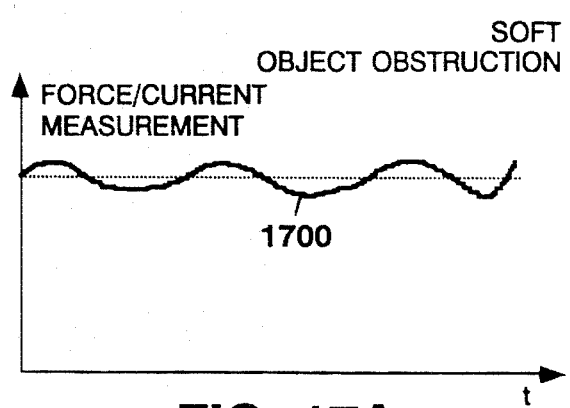
FIGS. 17A and 17B respectively show a force/current measurement timing diagram of the ripple current detected in association with a soft object obstruction and a corresponding processed digital waveform.
Figure 17B:
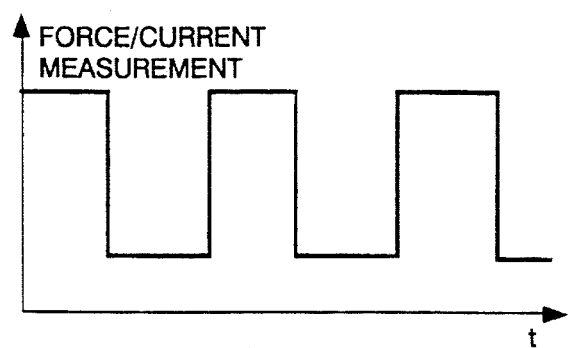
Figure 18A:
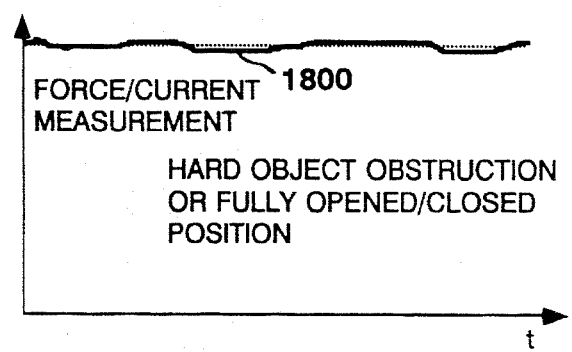
FIGS. 18A and 18B respectively show a force/current measurement timing diagram of the ripple current detected in association with a hard object obstruction or fully open/closed position and a corresponding processed digital waveform.
Figure 18B:
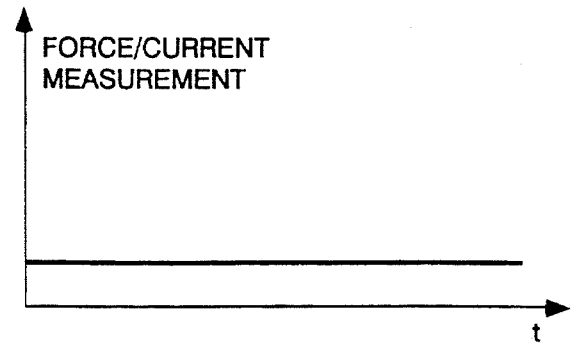

As shown in FIGS. 16A and 16B, both the measured ripple current 1600 and the amplified and regulated digital waves 1602 derived therefrom occur at a high frequency during a normal vent open and closing operations. As shown in FIGS. 17A and 17B, lower frequency ripple waves 1700 indicate either large track friction or obstruction of the vent by a soft object. Finally, FIGS. 18A and 18B illustrate that very low frequency or no ripple waves 1800 indicates that the vent is either in its fully opened/closed position or that there is a hard object obstructing the vent's path.

The use of such ripple current sensing devices eliminates noise, and the data relating to the ripple waves is typically easy to process by amplification and truncating into a square wave for further processing. For example, the digital wave may be compared to a predetermined threshold or thresholds to determine the specific condition causing the variations in the ripple waves of the operating current. Furthermore, such ripple wave sensing devices provide a good indication of vent positioning, thus eliminating the need for other positioning switches.

What is claimed is:

1. A method of controlling an electric motor associated with an opening in a vehicle, said method comprising:

monitoring an operating current provided to said motor;

detecting an obstacle in the opening by analysis of the monitored operating current with respect to a threshold condition;

determining an average value of said operating current;

modifying the threshold condition based on the determined average value; and generating a signal in response to the detection of an obstacle.

2. The method of claim 1, wherein the obstacle is detected when said monitored operating current exceeds the threshold condition.

3. The method of claim 1, further comprising altering said operating current in response to the generated signal.

4. The method of claim 1, wherein said modifying step comprises generating a new version of the threshold condition based on a sum of the determined average value and an offset value that corresponds to a predetermined percentage of a previous version of the threshold condition.

5. The method of claim 1, wherein the electric motor controls a closure that closes the opening.

6. The method of claim 5, further comprising determining a position of the closure.

7. The method of claim 6, further comprising altering said operating current in response to the generated signal and only when the position of the closure is within a predetermined range.

8. The method of claim 5, wherein the closure comprises a vehicle window, a sun roof, or a convertible top.

9. A method of controlling an electric motor associated with an opening in a vehicle, said method comprising:
   monitoring an operating current provided to said motor;
   detecting a motor stall current value in the monitored operating current;
   detecting an obstacle in the opening by analysis of the monitored operating current with respect to a threshold value;
   modifying the threshold value when the detected motor stall current value is less than the threshold value; and
   generating a signal in response to the detection of an obstacle.

10. The method of claim 9, wherein the modifying step further comprises modifying the threshold value when a monitored operating current exceeds a predetermined percentage of the threshold value and is less than the threshold value.

11. The method of claim 9, wherein the obstacle is detected when said monitored operating current exceeds the threshold value.

12. The method of claim 9, wherein the electric motor controls a closure that closes the opening.

13. The method of claim 12, further comprising determining a position of the closure; wherein the step of detecting the motor stall current value in the monitored operating current comprises detecting the motor stall current value when the closure reaches a fully open position.

14. The method of claim 12, further comprising:
   determining a position of the closure; and
   altering said operating current in response to the generated signal and only when the position of the closure is within a predetermined range.

15. The method of claim 12, wherein the closure comprises a vehicle window, a sun roof, or a convertible top.

16. A method of controlling an electric motor associated with an opening in a vehicle, said method comprising:
   monitoring an operating current provided to said motor;
   detecting a motor start spike current value in the monitored operating current;
   detecting an obstacle in the opening by analysis of the monitored operating current with respect to a threshold value that corresponds to a motor start spike current value;
   modifying the threshold value when a detected motor start spike current value is less than the threshold value; and
   generating a signal in response to the detection of an obstacle.

17. A method of controlling an electric motor associated with an opening in a vehicle, said method comprising:
   monitoring an operating current provided to said motor;
   detecting an obstacle in the opening by analysis of the monitored operating current with respect to a threshold value;
   modifying the threshold value when a monitored operating current exceeds a predetermined percentage of the threshold value and is less than the threshold value; and
   generating a signal in response to the detection of an obstacle.

18. The method of claim 17, wherein the obstacle is detected when said monitored operating current exceeds the threshold value.

19. The method of claim 17, wherein the electric motor controls a closure that closes the opening, and further comprising:
   determining a position of the closure; and
   altering said operating current in response to the generated signal and only when the position of the closure is within a predetermined range.

20. The method of claim 17, wherein the electric motor controls a closure that closes the opening, and wherein the closure comprises a vehicle window, a sun roof, or a convertible top.
   generating a signal in response to the detection of an obstacle.

21. A method of controlling an electric motor associated with an opening in a vehicle, said method comprising:
   monitoring an operating current provided to said motor;
   detecting an obstacle in the opening by analysis of the monitored operating current with respect to a threshold value;
   generating a new version of the threshold value based on a previous value of the monitored operating current and an offset value that corresponds to a predetermined percentage of a previous version of the threshold value; and
   generating a signal in response to the detection of an obstacle.

22. The method of claim 21, wherein the obstacle is detected when said monitored operating current exceeds the threshold value.

23. The method of claim 21, wherein the electric motor controls a closure that closes the opening, and further comprising:
   determining a position of the closure; and
   altering said operating current in response to the generated signal and only when the position of the closure is within a predetermined range.

24. The method of claim 21, wherein the electric motor controls a closure that closes the opening, and wherein the closure comprises a vehicle window, a sun roof, or a convertible top.

25. A system for controlling an electric motor associated with an opening in a vehicle, said system comprising:
   monitoring circuitry configured to monitor an operating current provided to the motor and to determine an average value of said operating current; and
   a controller connected to the monitoring circuitry, the controller being configured to:
      detect the presence of an obstacle in the opening by analysis of the monitored operating current with respect to a threshold condition,
      modify the threshold condition based on the determined average value, and
      generate a signal in response to the detection of an obstacle.

26. The system of claim 25, wherein the controller is configured to detect the obstacle when said monitored operating current exceeds the threshold condition.

27. The system of claim 25, further comprising power control circuitry connected to the controller and configured to alter said operating current in response to the generated signal from the controller.

28. The system of claim 25, wherein said controller is configured to generate a new version of the threshold condition based on a sum of the determined average value and an offset value that corresponds to a predetermined percentage of a previous version of the threshold condition.

29. The system of claim 25, wherein the electric motor controls a closure that closes the opening.

30. The system of claim 29, further comprising position detection circuitry configured to determine a position of the closure.

31. The system of claim 30, further comprising power control circuitry connected to the controller and the position detection circuitry and configured to alter said operating current in response to the generated signal from the controller only when the position of the closure is within a predetermined range.

32. The system of claim 29, wherein the closure comprises a vehicle window, a sun roof, or a convertible top.

33. A system for controlling an electric motor associated with an opening in a vehicle, said system comprising:
   monitoring circuitry configured to monitor an operating current provided to the motor; and
   a controller connected to the monitoring circuitry, the controller being configured to:
      detect the presence of an obstacle in the opening by analysis of the monitored operating current with respect to a threshold value that corresponds to a motor stall current value,
      detect a motor stall current value in the monitored operating current,
      modify the threshold value when the detected motor stall current value is less than the threshold value, and
      generate a signal in response to the detection of an obstacle.

34. The system of claim 33, wherein the controller is configured to modify the threshold value when a monitored operating current exceeds a predetermined percentage of the threshold value and is less than the threshold value.

35. The system of claim 33, wherein the controller is configured to detect the obstacle when said monitored operating current exceeds the threshold value.

36. The system of claim 33, wherein the electric motor controls a closure that closes the opening.

37. The system of claim 36, further comprising position detection circuitry configured to determine a position of the closure.

38. The system of claim 37, wherein the controller is configured to detect the motor stall current value in the monitored operating current when the closure reaches a fully open position.

39. The system of claim 37, wherein the controller is configured to alter said operating current in response to the generated signal and only when the position of the closure is within a predetermined range.

40. The system of claim 36, wherein the closure comprises a vehicle window, a sun roof, or a convertible top.

41. A system for controlling an electric motor associated with an opening in a vehicle, said system comprising:
   monitoring circuitry configured to monitor an operating current provided to the motor; and
   a controller connected to the monitoring circuitry, the controller being configured to:
      detect the presence of an obstacle in the opening by analysis of the monitored operating current with respect to a threshold value that corresponds to a motor start spike current value,
      detect a motor start spike current value in the monitored operating current,
      modify the threshold value when the detected motor start spike current value is less than the threshold value, and
      generate a signal in response to the detection of an obstacle.

42. A system for controlling an electric motor associated with an opening in a vehicle, said system comprising:
   monitoring circuitry configured to monitor an operating current provided to the motor; and
   a controller connected to the monitoring circuitry, the controller being configured to:
      detect the presence of an obstacle in the opening by analysis of the monitored operating current with respect to a threshold value,
      modify the threshold value when a monitored operating current exceeds a predetermined percentage of the threshold value and is less than the threshold value, and
      generate a signal in response to the detection of an obstacle.

43. The system of claim 42, wherein the controller is configured to detect the obstacle when said monitored operating current exceeds the threshold value.

44. The system of claim 42, wherein the electric motor controls a closure that closes the opening, the system further comprising position detection circuitry configured to determine a position of the closure; and wherein the controller is configured to alter said operating current in response to the generated signal and only when the position of the closure is within a predetermined range.

45. The system of claim 42, wherein the electric motor controls a closure that closes the opening, and wherein the closure comprises a vehicle window, a sun roof, or a convertible top.

46. A system for controlling an electric motor associated with an opening in a vehicle, said system comprising:
   monitoring circuitry configured to monitor an operating current provided to the motor; and
   a controller connected to the monitoring circuitry, the controller being configured to:
      detect the presence of an obstacle in the opening by analysis of the monitored operating current with respect to a threshold value,
      generate a new version of the threshold value based on a previous value of the monitored operating current and an offset value that corresponds to a predetermined percentage of a previous version of the threshold value, and
      generate a signal in response to the detection of an obstacle.

47. The system of claim 46, wherein the controller is configured to detect the obstacle when said monitored operating current exceeds the threshold value.

48. The system of claim 46, wherein the electric motor controls a closure that closes the opening, the system further comprising position detection circuitry configured to determine a position of the closure; and wherein the controller is configured to alter said operating current in response to the generated signal and only when the position of the closure is within a predetermined range.

49. The system of claim 46, wherein the electric motor controls a closure that closes the opening, and wherein the closure comprises a vehicle window, a sun roof, or a convertible top.

* * * * *